(12) United States Patent
Vassieux et al.

(10) Patent No.: US 11,548,369 B2
(45) Date of Patent: Jan. 10, 2023

(54) HYBRID DRIVE SUB-ASSEMBLY FOR A VEHICLE

(71) Applicant: VALEO EMBRAYAGES, Amiens (FR)

(72) Inventors: Loic Vassieux, Cergy Pontoise (FR); Dominique Lheureux, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 17/643,495

(22) Filed: Dec. 9, 2021

(65) Prior Publication Data
US 2022/0176803 A1   Jun. 9, 2022

(30) Foreign Application Priority Data

Dec. 9, 2020 (FR) ..................................... 20 12907

(51) Int. Cl.
| | |
|---|---|
| *B60K 6/48* | (2007.10) |
| *B60K 6/365* | (2007.10) |
| *B60K 6/387* | (2007.10) |
| *B60K 6/547* | (2007.10) |

(52) U.S. Cl.
CPC ............... *B60K 6/48* (2013.01); *B60K 6/365* (2013.01); *B60K 6/387* (2013.01); *B60K 6/547* (2013.01); *B60K 2006/4825* (2013.01); *B60K 2006/4841* (2013.01)

(58) Field of Classification Search
None
See application file for complete search history.

(56) References Cited

U.S. PATENT DOCUMENTS

| | | | |
|---|---|---|---|
| 8,257,221 B2 * | 9/2012 | Leufgen | B60W 20/40 477/6 |
| 11,400,804 B2 * | 8/2022 | Hunold | B60K 6/383 |
| 2008/0234098 A1 | 9/2008 | Leufgen | |

FOREIGN PATENT DOCUMENTS

| | | |
|---|---|---|
| DE | 28 05 594 A1 | 8/1979 |
| EP | 0 492 152 A1 | 7/1992 |

(Continued)

OTHER PUBLICATIONS

EP 0492152 A1 translation (Year: 2021).*

(Continued)

*Primary Examiner* — Dirk Wright
(74) *Attorney, Agent, or Firm* — Oblon, McClelland, Maier & Neustadt, L.L.P.

(57) ABSTRACT

A hybrid drive sub-assembly for a vehicle, including primary toothed wheels, secondary toothed wheels capable of being coupled to a secondary shaft, an intermediate shaft to which intermediate toothed wheels are rigidly connected for rotation therewith, the primary toothed wheel(s) and the secondary toothed wheel(s) each permanently meshing with a corresponding toothed wheel of the intermediate toothed wheels. This hybrid sub-assembly is provided with a motorized module including a reversible electric machine, an interface for connection to the intermediate shaft, a speed reducer, a power take-off member and a dual clutch mechanism capable of coupling and uncoupling the power take-off member to and from the reversible electric machine and the intermediate shaft.

20 Claims, 3 Drawing Sheets

(56) References Cited

FOREIGN PATENT DOCUMENTS

EP       1 972 481 A1     9/2008
GB       2493961 A     2/2013

OTHER PUBLICATIONS

EP 1972481 A1 translation (Year: 2021).*
EP search opinion 21211421 A1 (Year: 2020).*
French Preliminary Search Report dated Aug. 11, 2021 in French Application 20 12907 filed on Dec. 9, 2020, 10 pages (with English Translation of Categories of Cited Documents & Written Opinion).

* cited by examiner

HYBRID DRIVE SUB-ASSEMBLY FOR A VEHICLE

TECHNICAL FIELD OF THE INVENTION

The invention relates to a hybrid drive sub-assembly suitable for being positioned between an engine, for example an internal combustion engine, and an assembly of one of more driving wheels of a vehicle. It particularly, but not exclusively, relates to such a sub-assembly suitable for being provided on a heavy goods vehicle, that is, a road vehicle weighing more than 3.5 tonnes, in particular a road tractor, or a truck. The invention also relates to a motorized module capable of being incorporated into the hybrid drive sub-assembly.

PRIOR ART

WO2011/072986A1 describes a hybrid drive sub-assembly for a vehicle, including a primary shaft suitable for being driven by an internal combustion engine of the vehicle, a secondary shaft suitable for driving an assembly of one or more driving wheels of the vehicle, and a transmission gearbox including one or more primary toothed wheels rigidly connected to the primary shaft for rotation therewith or capable of being coupled to the primary shaft, a plurality of secondary toothed wheels rigidly connected to the secondary shaft for rotation therewith or capable of being coupled to the secondary shaft, and two intermediate shafts to which intermediate toothed wheels are rigidly connected for rotation therewith, the primary toothed wheel(s) and the secondary toothed wheel(s) each meshing with a corresponding toothed wheel of the intermediate toothed wheels. The hybrid drive sub-assembly further includes a reversible electric machine kinematically linked to the intermediate shafts via an upstream gear reduction stage and a dog coupling mechanism, said electric machine being capable of operating as a current generator in order to brake the intermediate shafts or as a drive motor for the intermediate shafts. Such an electric machine makes it possible to envisage different operating modes, and in particular transitional operation of the electric machine in order to brake or accelerate the intermediate shafts and promote the synchronization of the transmission gearbox in the gearshift phases, operation as a motor in order to assist the drive of the main engine of the vehicle outside the gearshift phases, and operation as an electrical generator in order to supply electricity to accessories of the vehicle or to a battery, in particular in braking phases of the vehicle. In this hybrid drive sub-assembly, the reversible electric machine is arranged in line relative to the internal combustion engine, that is, the rotor of the electric machine is concentric with the output of the internal combustion engine.

In the device described in WO2011/072986A1, a mechanical power take-off member, or PTO, can be driven solely by the reversible electric machine of the hybrid drive sub-assembly. To this end, the transmission gearbox adopts a neutral position in which, when the vehicle is stationary, the clutch coupling the internal combustion engine to the primary shaft is also disengaged. The power take-off member is used solely by means of the reversible electric machine, thus limiting its operating capacity.

DISCLOSURE OF THE INVENTION

The invention aims to overcome the drawbacks of the prior art and propose improved incorporation of an electric machine into a hybrid drive sub-assembly when it is coupled to a power take-off member and to an intermediate shaft of a transmission gearbox.

To this end, a first aspect of the invention proposes a motorized module for driving and braking an intermediate shaft of a hybrid sub-assembly including a plurality of primary toothed wheels suitable for being driven by a main engine of the vehicle, a secondary shaft suitable for driving an assembly of one or more driving wheels of the vehicle, a plurality of secondary toothed wheels capable of being coupled to the secondary shaft, and intermediate toothed wheels rigidly connected to the intermediate shaft for rotation therewith, the primary toothed wheel(s) and the secondary toothed wheel(s) each permanently meshing with a corresponding toothed wheel of the intermediate toothed wheels, the motorized module including at least one reversible electric machine capable of driving and braking the intermediate shaft and a connection interface capable of being kinematically linked to the intermediate shaft for rotation therewith, characterized in that the motorized module comprises a dual clutch mechanism including:
- a torque transmission casing kinematically linked to the connection interface;
- a first multi-disc clutch capable of switching from a coupled state for coupling the torque transmission casing to a first coupling member, to an uncoupled state for uncoupling the torque transmission casing from the first coupling member, the first coupling member being kinematically linked to a power take-off member;
- a second multi-disc clutch capable of switching from a coupled state for coupling the torque transmission casing to a second coupling member, to an uncoupled state for uncoupling the torque transmission casing from the second coupling member, the second coupling member being kinematically linked to the reversible electric machine;

said motorized module comprising a speed reducer arranged kinematically between the reversible electric machine and the second coupling member.

Using a first multi-disc clutch makes it possible to couple the power take-off member to the intermediate shaft when the vehicle is moving. Unlike a dog mechanism, there is no need to synchronize the rotation speed of the two rotating elements such as the power take-off member and the intermediate shaft.

Installing a dual clutch mechanism between the reversible electric machine, the power take-off member and the intermediate shaft makes it possible to obtain an axially compact motorized module. The motorized module can easily be fitted to a conventional transmission gearbox in order to convert it more cheaply into a hybrid sub-assembly.

Inserting a dual clutch mechanism between the reversible electric machine, the power take-off member and the intermediate shaft makes it possible to envisage transitional operation of the electric machine in order to brake or accelerate the intermediate shafts and promote the synchronization of the transmission gearbox in the gearshift phases, operation as a motor in order to assist the drive of the main engine of the vehicle outside the gearshift phases, and operation as an electrical generator in order to supply electricity to accessories of the vehicle or to a battery, in particular in braking phases of the vehicle.

The reversible electric machine can be uncoupled simply by actuating the first multi-disc clutch when it is not necessary for the operation of the transmission gearbox. An additional advantage is that uncoupling the electric machine makes it possible to take the load off the guide bearings of the rotor of the electric machine, which increases their service life.

When the two multi-disc clutches are simultaneously in a coupled state, it is possible to use the power take-off member solely by means of the reversible electric machine.

Advantageously, the motorized module can comprise a third multi-disc clutch capable of switching from a coupled state for coupling the torque transmission casing to the connection interface, to an uncoupled state for uncoupling the torque transmission casing from the connection interface, the third multi-disc clutch being arranged axially next to the dual clutch mechanism.

The reversible electric machine can in particular be a permanent-magnet synchronous machine, an asynchronous machine, a variable reluctance electric machine or a so-called synchro-reluctance variable reluctance synchronous electric machine.

The reversible electric machine can have an axis of rotation parallel to an axis of rotation of the connection interface, preferably separate from the axis of rotation of the connection interface.

The connection interface can for example be a splined section of shaft or a splined sleeve. It can also be a circular plate with through-holes for fastening screws (the intermediate shaft comprising a supporting face provided with threaded holes), or a shaft provided with a key.

The speed reducer can advantageously be a planetary gear set reduction gear or a parallel shaft reduction gear or a belt reduction gear. As a result, the speed reducer makes it possible to adjust the rotation speed of the electric machine to suit the requirements of the hybrid sub-assembly.

Preferably, the motorized module can include a module housing for accommodating the speed reducer and the dual clutch mechanism, the reversible electric machine being accommodated in the housing, or fastened to the housing. The torque transmission casing can be capable of rotating relative to the module housing about the axis of rotation of the dual clutch mechanism.

Preferably, the first multi-disc clutch and the second multi-disc clutch are concentric.

The torque transmission housing may include friction disc receiving surfaces on which the multi-disc assemblies of the first clutch and of the second clutch are meshed with the aid of splines.

According to one variant, the first multi-disc clutch and the second multi-disc clutch are wet. The torque transmission casing can comprise orifices for the passage of cooling oil. The heat exchange capacity of the multi-disc clutches is improved. According to this variant, the module housing can be arranged to collect the cooling oil after it has passed through the multi-disc clutches.

According to another variant, the first multi-disc clutch and the second multi-disc clutch are dry.

According to one embodiment, the dual clutch mechanism can have a radial architecture in which the first and second multi-disc clutches are arranged radially one above the other, the torque transmission casing being common to the first and second multi-disc clutches. This architecture has the advantage of being axially compact.

Preferably, the axis of rotation of the dual clutch mechanism can be concentric with the axis of the power take-off member and/or concentric with the axis of the reversible electric machine.

Advantageously, the shaft of the power take-off member can pass through the rotor of the reversible electric machine.

According to another embodiment, the dual clutch mechanism can have an axial architecture in which the first and second multi-disc clutches are arranged axially next to each other, the torque transmission casing being common to the first and second multi-disc clutches.

Preferably, a gear train can be kinematically arranged between the first coupling member and the power take-off member, the power take-off member having an axis of rotation parallel to the axis of rotation of the dual clutch mechanism, preferably separate from the axis of rotation of the dual clutch mechanism.

According to another aspect of the invention, it relates to a hybrid drive sub-assembly for a vehicle, including:
  a plurality of primary toothed wheels suitable for being driven by a main engine of the vehicle,
  a secondary shaft suitable for driving an assembly of one or more driving wheels of the vehicle,
  a plurality of secondary toothed wheels capable of being coupled to the secondary shaft,
  an intermediate shaft to which intermediate toothed wheels are rigidly connected for rotation therewith, the primary toothed wheel(s) and the secondary toothed wheel(s) each permanently meshing with a corresponding toothed wheel of the intermediate toothed wheels,
  at least one motorized module having all or some of the aforementioned features, the connection interface of the motorized module being rigidly connected to the intermediate shaft for rotation therewith.

Preferably, the hybrid sub-assembly includes a transmission housing defining a cavity for accommodating the primary toothed wheels, the secondary toothed wheels and the intermediate toothed wheels, the reversible electric machine being arranged outside the accommodation cavity. Preferably, the dual clutch mechanism is situated outside the accommodation cavity. In this case, the motorized module preferably includes a module housing as described above, which is preferably fastened to the transmission housing.

Advantageously, the reversible electric machine has an axis of rotation parallel to an axis of rotation of the intermediate shaft, one or more of the following features being present:
  the axis of rotation of the reversible electric machine is separate from the axis of rotation of the intermediate shaft;
  the axis of rotation of the reversible electric machine is separate from an axis of rotation of the primary toothed wheels;
  the axis of rotation of the reversible electric machine is separate from an axis of rotation of the secondary shaft.

According to another aspect of the invention, it relates to the use of a motorized module having all or some of the aforementioned features, said motorized module comprising a third multi-disc clutch capable of switching from a coupled state for coupling the torque transmission casing to the connection interface, to an uncoupled state for uncoupling the torque transmission casing from the connection interface, characterized in that the first and second multi-disc clutches are simultaneously in a coupled state and the third multi-disc clutch is in an uncoupled state, so that the reversible electric machine can drive the power take-off member independently of the intermediate shaft. The use of this motorized module according to the invention makes it possible to use the power take-off member in an environment in which the user wishes to avoid the polluting emissions of the main engine of the vehicle.

The invention will be better understood, and further aims, details, features and advantages thereof will become more clearly apparent from the following description of a particular embodiment of the invention, which is given solely by way of non-limiting illustration, with reference to the appended figures.

BRIEF DESCRIPTION OF THE FIGURES

Further features and advantages of the invention will become apparent from reading the following description, with reference to the appended figures.

For greater clarity, identical or similar elements are identified using identical reference signs in all of the figures.

DETAILED DESCRIPTION OF EMBODIMENTS

Figure 1:
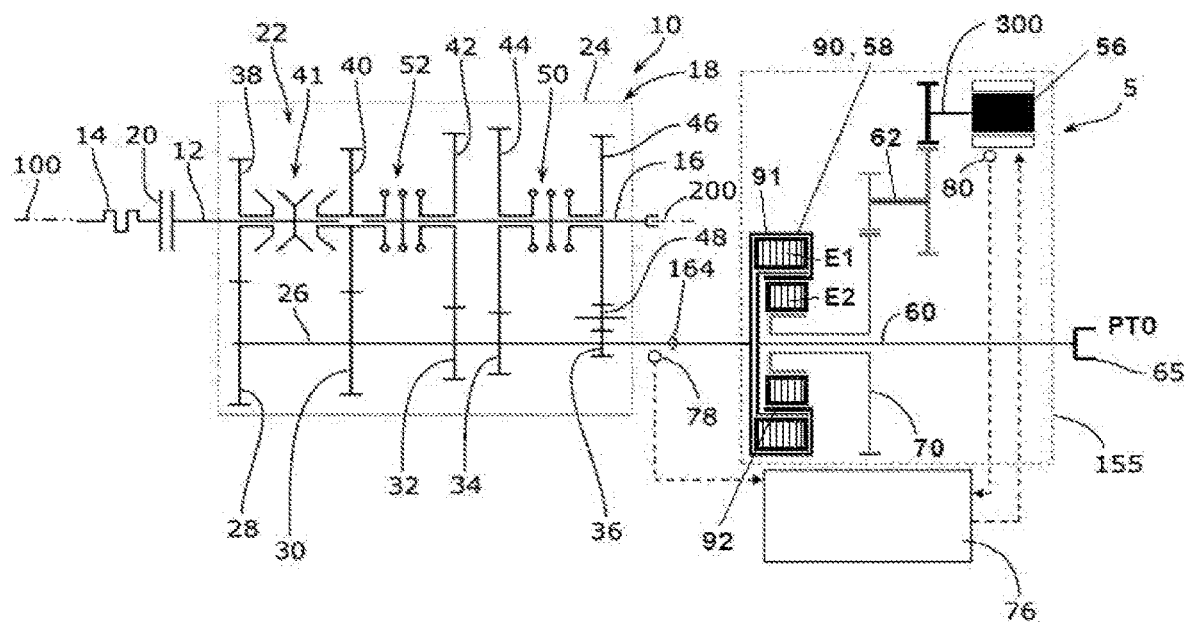
FIG. 1 illustrates a hybrid drive sub-assembly for a vehicle according to a first embodiment.

FIG. 1 illustrates a hybrid drive sub-assembly 10 for a vehicle according to a first embodiment of the invention, including a first shaft 12 suitable for being driven by a main engine 14 of the vehicle, for example an internal combustion engine, a secondary shaft 16 suitable for driving an assembly of one or more driving wheels of the vehicle (not illustrated), and a transmission gearbox 18.

The connection between the main engine 14 and the primary shaft 12 can include a clutch 20 of any suitable type, for example a sliding clutch. The connection between the secondary shaft 16 and the wheels of the vehicle can include one or more motor axles.

The transmission gearbox 18, accommodated inside a cavity 22 of a transmission housing 24, includes an intermediate shaft 26 to which intermediate toothed wheels 28, 30, 32, 34, 36 are rigidly connected for rotation therewith. Two primary toothed wheels 38, 40 coaxial with the primary shaft 12 each form a gear train with a corresponding toothed wheel 28, 30 respectively of the intermediate toothed wheels. The meshing of the gear trains 38, 28 and 40, 30 between the primary toothed wheels 38, 40 and the corresponding intermediate toothed wheels 28, 30 is permanent. A three-position dual synchronizer 41 makes it possible to couple one or other of the primary toothed wheels 38, 40 to the primary shaft 12, and has a neutral position in which neither of the primary toothed wheels 38, 40 is coupled to the primary shaft 12.

Secondary toothed wheels 42, 44, 46, coaxial with the secondary shaft 16 likewise each form a gear train with a corresponding toothed wheel 32, 34, 36 respectively of the intermediate toothed wheels, one of the gear trains being a reversing gear train and including an intermediate wheel 48 for producing a reverse gear. The meshing of the gear trains formed by the secondary toothed wheels 42, 44, 46 and the corresponding intermediate toothed wheels 32, 34, 36 is permanent. A three-position dog coupling 50 without synchronizers, positioned between two of the secondary toothed wheels 44, 46, makes it possible to either couple one or other of the two associated secondary toothed wheels 44, 46 to the secondary shaft 16, or, in an intermediate neutral position, to keep the associated secondary toothed wheels 44, 46 uncoupled from the secondary shaft 16.

In this embodiment, the axis of rotation 100 of the primary shaft 12 is aligned with the axis of rotation 200 of the second shaft 16, which makes it possible to use the end primary toothed wheel 40 either as a primary toothed wheel, associated with the primary shaft 12 by the synchronizer 41, or as a secondary toothed wheel associated with the secondary shaft 16. To this end a three-position dog coupling 52 without synchronizers, positioned between the end primary toothed wheel 40 and the secondary toothed wheel 42, makes it possible to couple either the end primary toothed wheel 40 or the secondary toothed wheel 42 to the secondary shaft 16, and also makes it possible, in an intermediate neutral position, to keep the end primary toothed wheel 40 and the secondary toothed wheel 42 uncoupled from the secondary shaft 16.

A transmission gearbox 18 with six forward gears and potentially two reverse gears can thus be obtained, which can if applicable be coupled at the output of the secondary shaft 16 to a planetary gear set (not illustrated) in order to obtain a twelve-speed gearbox. However, this number of gears is not limited.

Notably, the hybrid drive sub-assembly 10 is provided with a motorized module 5 including a power take-off member 65 kinematically linked to the intermediate shaft 26 and a reversible electric machine 56 for driving and braking the intermediate shaft 26, the rotor of which rotates about a rotation shaft 300.

In order to progressively synchronize the reversible electric machine 56 with the power take-off member 65 and the intermediate shaft 26, a dual clutch mechanism 58 is arranged at the end of said intermediate shaft 26. Said dual clutch mechanism 58 includes in particular:

a torque transmission casing 90 kinematically linked to a connection interface 164 of the intermediate shaft 26;

a first multi-disc clutch E1 capable of switching from a coupled state for coupling the torque transmission casing 90 to a first coupling member 60, to an uncoupled state for uncoupling the torque transmission casing from the first coupling member, the first coupling member 60 being kinematically linked to a power take-off member 65, also referred to as a PTO;

a second multi-disc clutch E2 capable of switching from a coupled state for coupling the torque transmission casing 90 to a second coupling member 70, to an uncoupled state for uncoupling the torque transmission casing from the second coupling member, the second coupling member 70 being kinematically linked to the reversible electric machine 56.

Using sliding multi-disc clutches makes it possible to transmit high torques and synchronize the opening and closing thereof without taking into account the operating state of the vehicle. When stationary or when moving, the driver of the vehicle can use all of the functions of the motorized module 5.

The multi-disc clutches E1, E2 can be dry or wet.

Figure 5:
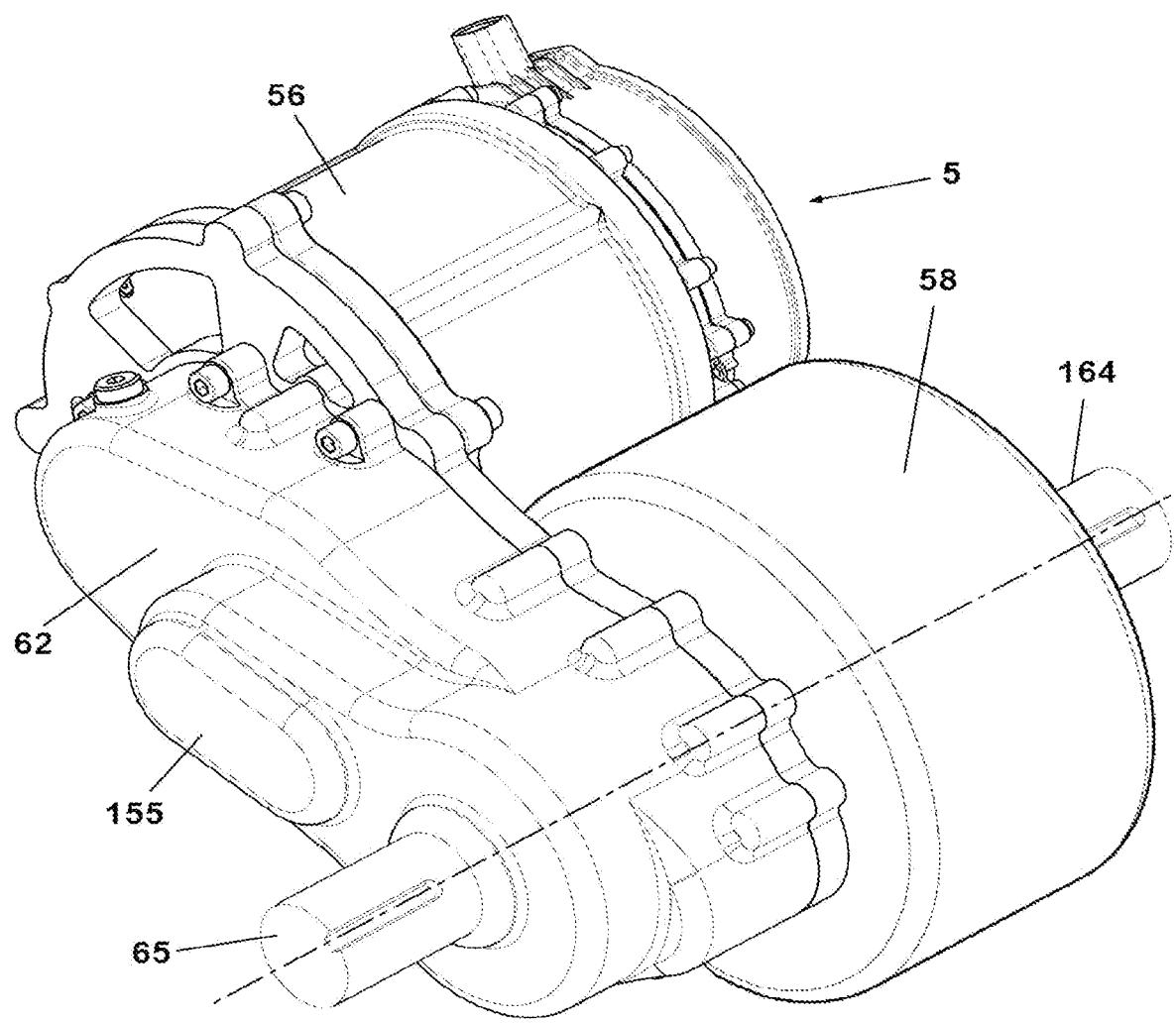
FIG. 5 illustrates a motorized module capable of being incorporated into the hybrid drive sub-assembly for a vehicle according to the first embodiment.

The motorized module 5 also comprises a speed reducer 62 arranged kinematically between the reversible electric machine 56 and the second coupling member 70. In the example of the first embodiment, the speed reducer 62 is a parallel shaft reduction gear. At least some of the elements of the motorized module 5 can be accommodated in a module housing 155, in particular the dual clutch mechanism 58, the speed reducer gear train 62, if applicable the connection interface 164, the power take-off member 65 and the reversible electric machine 56. Alternatively, as illustrated in FIG. 5, the latter can be arranged outside the module housing 155, if applicable fastened to the module housing 155.

The dual clutch mechanism 58 has a radial architecture in which the first and second multi-disc clutches E1, E2 are arranged radially one above the other. More specifically, the first multi-disc clutch E1 is positioned radially around the second multi-disc clutch E2. The rotation of the torque transmission casing 90 common to the first and second multi-disc clutches E1, E2 is guided on the module housing 155 by means of guide bearings.

The torque transmission casing 90 is connected upstream to the intermediate shaft 26 by the connection interface 164, which can for example consist of a splined section of shaft or a splined sleeve.

The torque transmission casing 90 comprises surfaces for receiving the friction discs on which the multi-disc assemblies of the first clutch E1 and of the second clutch E2 mesh by means of splines. According to the first embodiment, the torque transmission casing 90 thus comprises an outer disc-carrier 91 for receiving the friction discs of the first multi-disc assembly and an inner disc-carrier 92 for receiving the friction discs of the second multi-disc assembly. The torque transmission casing 90 can have a one-piece structure or comprise a plurality of components rigidly assembled with each other so that they transmit torque efficiently.

The torque transmission casing 90 is capable of rotating relative to the module housing 155 about the axis of rotation of the dual clutch mechanism 58.

The torque at the output of the first multi-disc clutch E1 is taken up by the first coupling member 60. The first coupling member 60 is a torque output disc-carrier directly connected to the power take-off member 65 the axis of rotation of which is concentric with the axis of rotation of the dual clutch mechanism 58. The power take-off member 65 can for example be a transmission shaft comprising an outer connection interface, for example a spline suitable for allowing the coupling of one or more accessories of the vehicle, for example a winch, a pump or an implement. The axes of rotation of the power take-off member 65 and of the connection interface 164 are preferably aligned.

The torque at the output of the second multi-disc clutch E2 is taken up by the second coupling member 70. The second coupling member 70 is a torque output disc-carrier kinematically linked to the reversible electric machine 56. The second coupling member 70 makes it possible to connect the reversible electric machine 56 to the intermediate shaft 26 when the second multi-disc clutch E2 is in a coupled state.

By way of illustration, provision can be made for a reversible electric machine 56 with a 48 volt power supply, with a reduction ratio between the output of the rotor of the electric machine and the dual clutch mechanism 58 of between 4 and 6, depending on whether preference is to be given to high torque or a high rotation speed.

According to another configuration, provision can be made for a reversible electric machine 56 with a high voltage power supply of between 300 and 800V, if the vehicle is driven solely by said reversible electric machine.

FIG. 5 illustrates an embodiment of the motorized module 5 produced in the form of a single module capable of being incorporated into the hybrid drive sub-assembly 10. The motorized module 5 further includes a module housing 155 for accommodating the speed reducer 62 and the dual clutch mechanism 58. In this example, the reversible electric machine 56 is fastened to the module housing 155. The reversible electric machine 56 can have an axis of rotation parallel to the axis of rotation of the connection interface 164 and separate from the axis of rotation of the connection interface 164. The connection interface 164 is a cylindrical shaft provided with a key.

The motorized module 5 is preferably arranged outside the main cavity 22 of the transmission gearbox housing 24, which makes it possible to offer this sub-assembly as optional equipment on a conventional transmission gearbox. The rotation shaft 300 of the reversible electric machine 56 can be parallel to the axes of rotation 100, 200 of the primary shaft 12 and the secondary shaft 16.

A control unit 76 makes it possible to control the reversible electric machine 56 and the dual clutch mechanism 58. Sensors 78, 80 are connected to the control unit for measuring the rotation speed of the intermediate shaft 26 and for measuring a rotation speed characteristic of the reversible electric machine 56, which can be a speed of the output shaft of the reversible machine 56 or a rotation speed of an element of the associated speed reducer 62. This control unit 76 can be incorporated into a robotic control of the transmission gearbox 18 that controls the opening and closing of the synchronizers 41, the dog mechanisms 50, 52 and, if applicable, the main clutch 20, in response to a torque or speed setpoint.

The reversible electric machine 56 makes it possible to envisage several operating modes.

A first use relates to the transitional gearshift phases of the transmission gearbox 18. During these transitional phases, the reversible electric machine 56 makes it possible to adjust the rotation speed of the intermediate shaft 26 to suit the synchronization requirements on the switching of the dog mechanisms 50, 52 or of the synchronizers 41, the electric machine being able to be used either as an electric motor in order to increase the rotation speed of the intermediate shaft 26 or as an electrodynamic brake in order to reduce this speed. This adjustment of the speed of the intermediate shaft 26 makes it possible to reduce the engagement or synchronization time, without resorting to a gearbox brake.

Outside the transitional phases, when a gear ratio is engaged, the reversible electric machine 56 can be used as a current generator, in order to charge a battery of the vehicle, or in order to modulate the slowing of the drive train when the main internal combustion engine 14 of the vehicle enters an engine braking regime. Again, when a gear ratio is engaged, the reversible electric machine 56 powered by a battery of the vehicle can be used as a motor in order to provide additional power to propel the vehicle.

The use of the reversible electric machine 56 for purely electric propulsion of the vehicle can also be envisaged by opening the clutch 20 or the synchronizers 41 in order to uncouple the main engine 14 or the primary shaft 12, while keeping one of the dog mechanisms 50, 52 engaged.

The dual clutch mechanism 58 is used to interrupt the connection between the intermediate shaft 26 and the reversible electric machine 56 when it is not useful, so as to limit the drag torque of the electric machine 56 and reduce the fuel consumption. It also makes it possible to envisage several operating modes of the power take-off member 65, regardless of the state of the vehicle, stationary or moving.

By opening the synchronizers 41, the dog mechanisms 50, 52 and, if applicable, the main clutch 20, the sub-assembly consisting of the reversible electric machine 56 and its speed reducer gear train 62 makes it possible to drive the power take-off member 65 by means of the reversible electric machine 56 used as a motor, independently of the transmission gearbox 18 and of the main engine 14 of the vehicle. Only the intermediate shaft 26 is driven by the reversible electric machine 56. Driving the power take-off member 65 by means of the reversible electric machine 56 without using the main engine of the vehicle makes it possible to achieve rotation speeds very much higher than 1,000 rpm, for example higher than 1,500 rpm, and if applicable up to 5,000 rpm.

In this operating mode, the reversible electric machine 56 can be powered from an energy source supplied by batteries of the vehicle or, if the vehicle is stationary, an external electricity source to which the vehicle is connected. This operating mode is applicable in particular when the main engine 14 is off, for example because the user wishes to drive the power take-off 65 in an environment in which they wish to avoid the polluting emissions from the main engine of the vehicle.

By closing the two multi-disc clutches E1, E2 of the dual clutch mechanism 58, the main engine 14 of the vehicle can be used, in conjunction with the reversible electric machine 56, to drive the power take-off member 65.

Figure 2:
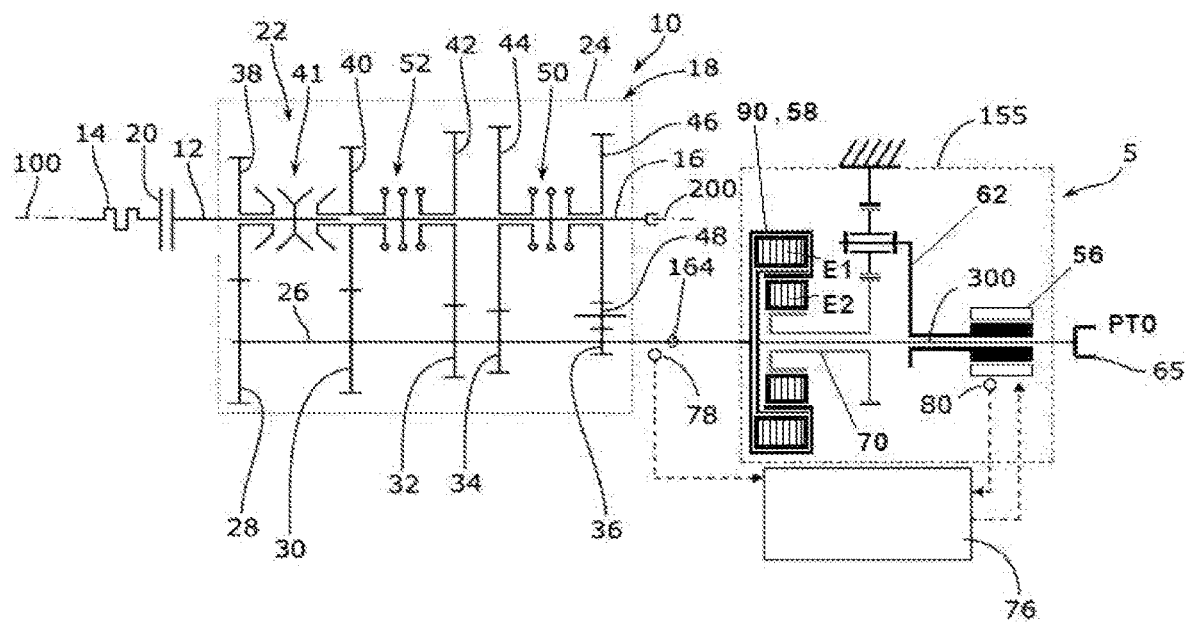
FIG. 2 illustrates a hybrid drive sub-assembly for a vehicle according to a second embodiment.

FIG. 2 illustrates a second embodiment of the invention, which differs from the previous embodiment in the positioning of the reversible electric machine 56, which is arranged concentrically with the dual clutch mechanism 58 and the intermediate shaft 26.

In this second embodiment, the speed reducer 62 is planetary gear set reduction gear and comprises a planet shaft connected to the second coupling member 70 of the second multi-disc clutch E2.

The module housing 155 can comprise a ring gear on which the planet gears of the planetary gear set reduction gear speed reducer 62 mesh.

The operation of this hybrid drive sub-assembly 10 is identical to the first embodiment, but has the advantage of offering a radially compact motorized module 5. In particular, the shaft of the power take-off member 65 passes through the rotor of the reversible electric machine 56.

According to another similar configuration of the second embodiment, provision can be made for a gear train 63 to be kinematically arranged between the first coupling member 60 and the power take-off member 65, the shaft of the power take-off member 65 having an axis of rotation parallel to an axis of rotation of the dual clutch mechanism 58 but separate from the axis of rotation of the dual clutch mechanism 58. In this configuration, the second multi-disc clutch E2 is positioned radially around the first multi-disc clutch E1.

Figure 3:
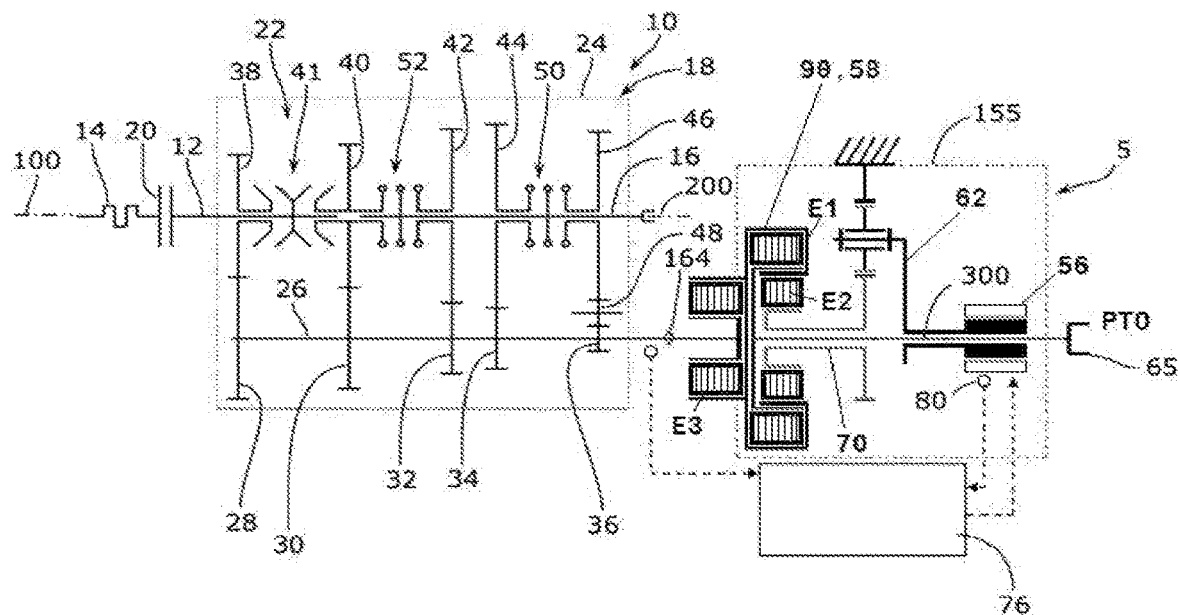
FIG. 3 illustrates a hybrid drive sub-assembly for a vehicle according to a third embodiment.

FIG. 3 illustrates a third embodiment of the invention, which differs from the previous embodiment in the use of a third multi-disc clutch E3 positioned axially next to the dual clutch mechanism 58.

In this third embodiment, the torque transmission casing 90 is rigidly connected to the outer disc-carrier of the third multi-disc clutch E3 for rotation therewith. The inner disc-carrier of the third multi-disc clutch E3 is directly connected to the connection interface 164.

The speed reducer 62 is a planetary gear set reduction gear and comprises a planet shaft connected to the second coupling member 70 of the second multi-disc clutch E2. Due to this architecture, the shaft of the power take-off member 65 passes through the rotor of the reversible electric machine 56.

The operation of this hybrid drive sub-assembly 10 according to this third embodiment is comparable to the first embodiment, but can offer different operating modes due to this third multi-disc clutch E3.

Opening the third multi-disc clutch E3 isolates the sub-assembly consisting of the reversible electric machine 56, its speed reducer gear train 62 and the power take-off member 65 from the intermediate shaft 26, which makes it possible to drive the power take-off member 65 by means of the reversible electric machine 56 used as a motor, independently of the transmission gearbox 18 and of the main engine 14 of the vehicle. In this operating mode, the reversible electric machine 56 can be powered from an energy source supplied by batteries of the vehicle or, if the vehicle is stationary, an external electricity source to which the vehicle is connected. This operating mode is applicable in particular when the main engine 14 is off, for example because the user wishes to drive the power take-off member 65 in an environment in which they wish to avoid the polluting emissions from the main engine of the vehicle. It can also be applicable when the main engine 14 is running, but the user wishes to drive the power take-off at a different speed from the speed of the intermediate shaft 26, whether the vehicle is stationary or moving. It can further be envisaged that the sensor 80 allows not only a speed measurement, but also a relative or absolute rotation angle measurement, so that the driving of the power take-off member 65 according to an angular displacement or angular position setpoint can be envisaged.

In this third embodiment of the invention, it is advantageous to provide a reversible electric machine 56 with a high-voltage power supply of between 300 and 800V if the power take-off member 65 is driven solely in electric mode, uncoupled from the intermediate shaft 26, but also if the vehicle is driven solely by the reversible electric machine 56.

Figure 4:
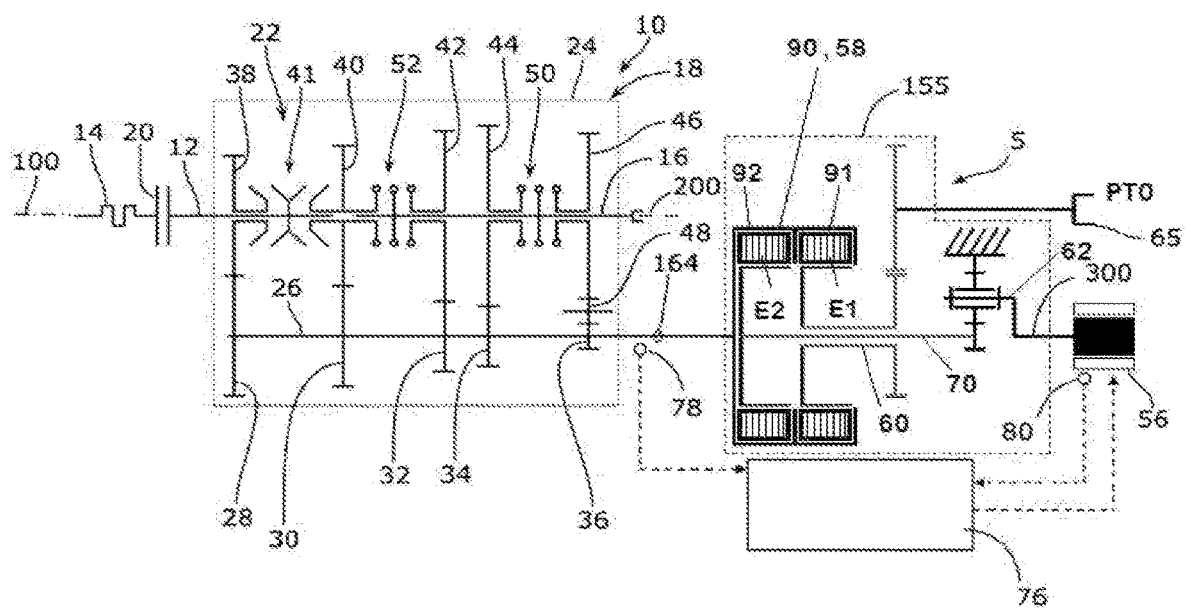
FIG. 4 illustrates a hybrid drive sub-assembly for a vehicle according to a fourth embodiment.

FIG. 4 illustrates a fourth embodiment of the invention, which differs from the second embodiment in the use of a dual clutch mechanism 58 having an axial architecture in which the first and second multi-disc clutches E1, E2 are arranged axially next to each other.

In this fourth embodiment, the torque transmission casing 90 remains common to the first and second multi-disc clutches E1, E2 and comprises surfaces for receiving the friction discs on which the multi-disc assemblies of the first clutch E1 and of the second clutch E2 mesh by means of splines.

The torque transmission casing 90 comprises an outer disc-carrier 91 for receiving the friction discs of the first multi-disc assembly and an inner disc-carrier 92 for receiving the friction discs of the second multi-disc assembly. The torque transmission casing 90 can have a one-piece structure or comprise a plurality of components rigidly assembled with each other so that they transmit torque efficiently.

The torque at the output of the first multi-disc clutch E1 is taken up by the first coupling member 60. The first coupling member 60 is a torque output disc-carrier directly connected to a gear train 63 kinematically arranged between the first coupling member 60 and the power take-off member 65. The shaft of the power take-off member 65 thus has an axis of rotation parallel to an axis of rotation of the dual clutch mechanism 58 but separate from the axis of rotation of the dual clutch mechanism 58. The power take-off member 65 can for example be a transmission shaft comprising an outer connection interface, for example a spline suitable for allowing the coupling of one or more accessories of the vehicle, for example a winch, a pump or an implement.

The torque at the output of the second multi-disc clutch E2 is taken up by the second coupling member 70. The second coupling member 70 makes it possible to connect the reversible electric machine 56 to the intermediate shaft 26 when the second multi-disc clutch E2 is in a coupled state. A planetary gear set reduction gear speed reducer 62 is inserted between the reversible electric machine 56 and the second coupling member 70.

In this fourth embodiment, the speed reducer 62 comprises a planet shaft directly connected to the second coupling member 70 of the second multi-disc clutch E2.

Of course, the examples shown in the figures and described above are only provided by way of a non-limiting illustration. Provision is explicitly made for the various illustrated embodiments to be combined in order to propose further embodiments.

By way of example, a second reversible electric machine associated with a speed reducer can be installed in all of the embodiments. The speed reducer 62 can be replaced by any other reduction mechanism, in particular a planetary gear set, or a belt or chain reduction mechanism. The input and output members of the reduction mechanism can be coaxial, parallel or in another orientation. The axis of rotation of the rotor of the first electric machine can be coaxial with the axis of rotation of the intermediate shaft, or parallel to and separate from the axis of rotation of the intermediate shaft, or in another orientation. The reversible electric machine(s) are preferably positioned outside the housing 24 of the transmission gearbox, but the reduction gear trains can be arranged inside or outside the main cavity 22 of the housing 24.

The description given herein of the transmission gearbox 18 is for illustration and is not intended to limit the scope of the teachings of this application, which can apply to other configurations, with a larger or smaller number of gears, with dog or synchronizer couplings. The transmission gearbox can for example comprise a second intermediate shaft.

The invention claimed is:

1. A motorized module for driving and braking an intermediate shaft of a hybrid sub-assembly comprising a plurality of primary toothed wheels suitable for being driven by a main engine of the vehicle, a secondary shaft suitable for driving an assembly of one or more driving wheels of the vehicle, a plurality of secondary toothed wheels capable of being coupled to the secondary shaft, and intermediate toothed wheels rigidly connected to the intermediate shaft for rotation therewith, the primary toothed wheel(s) and the secondary toothed wheel(s) each permanently meshing with a corresponding toothed wheel of the intermediate toothed wheels, the motorized module including at least one reversible electric machine capable of driving and braking the intermediate shaft, a connection interface capable of being kinematically linked to the intermediate shaft for rotation therewith, wherein the motorized module comprises a dual clutch mechanism including:
   a torque transmission casing kinematically linked to the connection interface;
   a first multi-disc clutch capable of switching from a coupled state for coupling the torque transmission casing to a first coupling member, to an uncoupled state for uncoupling the torque transmission casing from the first coupling member, the first coupling member being kinematically linked to a power take-off member;
   a second multi-disc clutch capable of switching from a coupled state for coupling the torque transmission casing to a second coupling member, to an uncoupled state for uncoupling the torque transmission casing from the second coupling member, the second coupling member being kinematically linked to the reversible electric machine;
   said motorized module comprising a speed reducer arranged kinematically between the reversible electric machine and the second coupling member.

2. The motorized module according to claim 1, wherein the speed reducer is a planetary gear set reduction gear or a parallel shaft reduction gear or a belt reduction gear.

3. The motorized module according to claim 2, wherein the motorized module comprises a module housing for accommodating the speed reducer and the dual clutch mechanism, the reversible electric machine being accommodated in the housing, or fastened to the housing.

4. The motorized module according to claim 2, wherein the axis of rotation of the dual clutch mechanism is concentric with the axis of the power take-off member and/or with the axis of the reversible electric machine.

5. The motorized module according to claim 2, wherein the dual clutch mechanism has a radial architecture wherein the first and second multi-disc clutches are arranged radially one above the other, the torque transmission casing being common to the first and second multi-disc clutches.

6. The motorized module according to claim 2, wherein the dual clutch mechanism has an axial architecture wherein the first and second multi-disc clutches are arranged axially next to each other, the torque transmission casing being common to the first and second multi-disc clutches.

7. The motorized module according to claim 2, wherein the shaft of the power take-off member passes through the rotor of the reversible electric machine.

8. The motorized module according to claim 2, wherein a gear train is kinematically arranged between the first coupling member and the power take-off member, the power take-off member having an axis of rotation parallel to the axis of rotation of the dual clutch mechanism, separate from the axis of rotation of the dual clutch mechanism.

9. The motorized module according to claim 1, wherein the motorized module comprises a module housing for accommodating the speed reducer and the dual clutch mechanism, the reversible electric machine being accommodated in the housing, or fastened to the housing.

10. The motorized module according to claim 1, wherein the axis of rotation of the dual clutch mechanism is concentric with the axis of the power take-off member and/or with the axis of the reversible electric machine.

11. The motorized module according to claim 1, wherein the dual clutch mechanism has a radial architecture wherein the first and second multi-disc clutches are arranged radially one above the other, the torque transmission casing being common to the first and second multi-disc clutches.

12. The motorized module according to claim 1, wherein the dual clutch mechanism has an axial architecture wherein the first and second multi-disc clutches are arranged axially next to each other, the torque transmission casing being common to the first and second multi-disc clutches.

13. The motorized module according to claim 1, wherein the shaft of the power take-off member passes through the rotor of the reversible electric machine.

14. The motorized module according to claim 1, wherein a gear train is kinematically arranged between the first coupling member and the power take-off member, the power take-off member having an axis of rotation parallel to the axis of rotation of the dual clutch mechanism separate from the axis of rotation of the dual clutch mechanism.

15. The motorized module according to claim 1, wherein the motorized module comprises a third multi-disc clutch capable of switching from a coupled state for coupling the torque transmission casing to the connection interface, to an uncoupled state for uncoupling the torque transmission casing from the connection interface, the third multi-disc clutch being arranged axially next to the dual clutch mechanism.

16. A method of driving and braking the intermediate shaft of the hybrid sub-assembly of the motorized module according to claim 15, said method comprising placing the first and second multi-disc clutches simultaneously in a coupled state and the third multi-disc clutch is in an uncoupled state, so that the reversible electric machine can drive the power take-off member independently of the intermediate shaft.

17. The motorized module according to claim 1, wherein the first multi-disc clutch and the second multi-disc clutch are wet, the torque transmission casing comprising orifices for the passage of cooling oil.

18. A hybrid drive sub-assembly for a vehicle, including comprising:
- a plurality of primary toothed wheels suitable for being driven by a main engine of the vehicle,
- a secondary shaft suitable for driving an assembly of one or more driving wheels of the vehicle,
- a plurality of secondary toothed wheels capable of being coupled to the secondary shaft,
- an intermediate shaft to which intermediate toothed wheels are rigidly connected for rotation therewith, the primary toothed wheel(s) and the secondary toothed wheel(s) each permanently meshing with a corresponding toothed wheel of the intermediate toothed wheels, and
- wherein the hybrid drive sub-assembly further comprises at least one motorized module according to claim 1, the connection interface of the motorized module being rigidly connected to the intermediate shaft for rotation therewith.

19. The hybrid sub-assembly according to claim 18, wherein the reversible electric machine has an axis of rotation parallel to an axis of rotation of the intermediate shaft, one or more of the following features being present:
- the axis of rotation of the reversible electric machine is separate from the axis of rotation of the intermediate shaft;
- the axis of rotation of the reversible electric machine is separate from an axis of rotation of the primary toothed wheels;
- the axis of rotation of the reversible electric machine is separate from an axis of rotation of the secondary shaft.

20. The hybrid sub-assembly according to claim 18, wherein the hybrid sub-assembly comprises a transmission housing defining a cavity for accommodating the primary toothed wheels, the secondary toothed wheels and the intermediate toothed wheels, the reversible electric machine being arranged outside the accommodation cavity.

\* \* \* \* \*